United States Patent
Moriya (10) Patent No.: US 7,495,729 B2
(45) Date of Patent: Feb. 24, 2009

(54) LIQUID CRYSTAL DISPLAY-SPECIFIC SUBSTRATE HAVING A PHASE DIFFERENCE CONTROL FUNCTION, AND LIQUID CRYSTAL DISPLAY USING THE SAME

(75) Inventor: Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 541 days.

(21) Appl. No.: 11/362,802

(22) Filed: Feb. 28, 2006

(65) Prior Publication Data
US 2006/0203160 A1 Sep. 14, 2006

Related U.S. Application Data

(63) Continuation-in-part of application No. 10/771,445, filed on Feb. 5, 2004, now abandoned.

(30) Foreign Application Priority Data
Feb. 5, 2003 (JP) .............................. 2003-028176

(51) Int. Cl.
  *G02F 1/1335* (2006.01)
(52) U.S. Cl. ..................................... 349/117
(58) Field of Classification Search .................. 349/117
See application file for complete search history.

(56) References Cited

U.S. PATENT DOCUMENTS

| 5,013,138 | A | 5/1991 | Roosen et al. |
| 6,016,178 | A | 1/2000 | Kataoka et al. |
| 6,577,364 | B1 | 6/2003 | Tillin et al. |
| 6,885,421 | B2 | 4/2005 | Miyachi |
| 2003/0058393 | A1 | 3/2003 | Terashita et al. |
| 2004/0080691 | A1 | 4/2004 | Mi et al. |

FOREIGN PATENT DOCUMENTS

JP 7-199173 A 4/1995

*Primary Examiner*—David Nelms
*Assistant Examiner*—Phu Vu
(74) *Attorney, Agent, or Firm*—Sughrue Mion, PLLC (57) ABSTRACT

A liquid crystal display capable of high-contrast displays, in which a phase difference control layer is positioned directly on a liquid crystal layer side of a substrate forming a part of an LCD, thereby canceling interfacial reflection due to an adhesive material. At least one of a positive uniaxial phase layer a including polymerizable liquid crystal molecules and having an optical axis within a layer plane and a negative uniaxial phase layer c including polymerizable liquid crystal molecules and having an optical axis in a normal direction to that layer plane is patterned on the inner surface at least one of transparent substrates (1) and (1') with a liquid crystal layer sandwiched between them.

26 Claims, 6 Drawing Sheets

ly crystal display-specific substrate having a phase difference control function, and liquid crystal display using the same

CROSS-REFERENCE TO RELATED APPLICATION

This is a Continuation-In-Part application of U.S. application Ser. No. 10/771,445 filed Feb. 5, 2004 now abandoned, incorporated herein by reference in its entirety.

BACKGROUND OF THE INVENTION

The present invention relates to a liquid crystal display-specific substrate having a phase difference control function and a liquid crystal display using the same, and more particularly to a liquid crystal display-specific substrate having a phase difference control layer patterned in a liquid crystal cell and a liquid crystal display using the same.

Having low-profile, low-mass, low power consumption and flickerless features, color liquid crystal displays (hereinafter referred to as LCD for a liquid crystal display) have boomed especially for notebook PCs. More recently, demand is growing for desktop monitors larger than notebook PCs as part of such PC-dedicated displays. LCDs are now used not only for PCs, but also for TVs for which CRTs have so far been mainly employed.

A grave problem with LCDs is a limited viewing angle. This is because when an LCD is viewed from an oblique direction, there is leakage of light from some pixels designed originally for black displays, which otherwise causes inversion of contrast, ending up with improper displays. With such defects in mind, there is developed a wide-viewing angle, vertical alignment mode LCD using a retardation film, which is free from any light leakage even with viewing angle increases in black display pixels, as set forth in Patent Publication 1 and Patent Publication 2.

Patent Publication 1
JP-A 10-153802
Patent Publication 2
JP-A 11-258605
Patent Publication 3
JP-A 7-258638
Patent Publication 4
JP-A 10-508882

Commonly, such a retardation film is affixed to a polarizing plate with optical axes positioned at a specific angle (an absorption axis in the case of the polarizing plate and an optical axis in the case of the retardation film). However, there is a low display contrast due to the interfacial reflection of light, because the refractive index of the adhesive used therewith is lower than those of the polarizing plate and retardation film.

With phase difference compensation having associated chromatic dispersion, compensation is generally made with emphasis on a specific wavelength. Often, phase difference compensation is performed with emphasis on green having the highest spectral luminous efficacy. For this reason, black display pixels can never be displayed in perfectly pure black, with leakages of red and blue light components, resulting in purplish black displays.

Another defect of the retardation film is that screen distortion occurs when applied to LCDs, because its volume varies upon absorption of moisture, causing phase difference variations. The larger the area of the retardation film, the more outstanding this tendency becomes, offering a particular problem in conjunction with liquid crystal TVs now under development in many aspects.

SUMMARY OF THE INVENTION

In view of such problems with the prior art as described above, one object of the invention is to make high contrast displays possible by the direct location on the liquid crystal layer side of a substrate forming a part of an LCD of a phase difference control layer that is usually used in a film state, thereby canceling interfacial reflection due to an adhesive material.

Another object of the invention is to provide a substrate of in-cell structure, which can be stacked directly on a substrate such as a transparent substrate or a color filter, thereby preventing any volume change due to the absorption of moisture, which is inherently found in conventional retardation films.

Yet another object of the invention is to provide a phase difference layer according to a pattern comprising areas associated with R (red), G (green) and B (blue), so that phase differences are separately controlled in the respective color areas, thereby making compensation for phase differences with no chromatic dispersion.

To accomplish the above objects, the present invention provides a liquid crystal display-specific substrate having a phase difference control function, used for transparent substrates with a liquid crystal layer in a liquid crystal display sandwiched between them, characterized in that:

at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane is patterned on the liquid crystal layer side.

Preferably in this aspect of the invention, the negative uniaxial phase layer comprising polymerizable liquid crystal molecules and having an optical axis in the normal direction to the layer plane comprises a mixture of polymerizable liquid crystal molecules and a chiral agent.

According to another aspect of the invention, there is provided a liquid crystal display-specific substrate having a phase difference control function, used for transparent substrates with a liquid crystal layer in a liquid crystal display sandwiched between said transparent substrates, characterized in that:

an alignment film, a positive uniaxial phase layer comprising polymerizable liquid crystal molecules and having an optical axis within a layer plane, and a negative uniaxial phase layer comprising polymerizable liquid crystal molecules and having an optical axis in a normal direction to said layer plane are stacked in this order on a liquid crystal layer side.

Preferably in this aspect of the invention, an additional alignment film is interposed between said positive uniaxial phase layer comprising polymerizable liquid crystal molecules and having an optical axis within a layer plane and said negative uniaxial phase layer comprising polymerizable liquid crystal molecules and having an optical axis in a normal direction to said layer plane.

In the first aspect of the invention, one of said positive uniaxial phase layer having an optical axis within a layer plane or said negative uniaxial phase layer having an optical axis in a normal direction to said layer plane could be applied in a film state to the liquid crystal layer opposite side of said transparent substrates between which said liquid crystal layer in said liquid crystal display is sandwiched.

Preferably, the liquid crystal display-specific substrate having a phase difference control function, obtained by patterning of at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane, comprises three-color areas of red, green and blue, and at least one of said phase difference control layers is patterned in alignment with said three-color areas for red, green and blue.

Preferably in the first and second aspects of the invention, the liquid crystal layer aligns in the vertical alignment mode.

Generally in the first and second aspects of the invention, the liquid crystal molecules used for said vertical alignment mode liquid crystal layer has a refractive index anisotropy of 0.05 to 0.30; the polymerizable liquid crystal molecules used as said phase layers have a refractive index anisotropy of 0.05 to 0.30; the vertical alignment mode liquid crystal layer has a thickness of 1.0 µm to 6.0 µm; and the phase layers comprising polymerizable liquid crystal molecules have a thickness of 0.1 µm to 10.0 µm.

The present invention also includes a liquid crystal display using one of the above liquid crystal display-specific substrate having a phase difference control function.

Thus, the present invention provides a liquid crystal display-specific substrate having a phase difference control function and a liquid crystal display using the same, wherein on a substrate of transparent substrates between which a liquid crystal layer in the liquid crystal display is sandwiched, said substrate being located on the liquid crystal layer side, there is patterned at least one of a positive uniaxial phase layer comprising polymerizable liquid crystal molecules and having an optical axis within a layer plane and a negative uniaxial phase layer comprising polymerizable liquid crystal molecules and having an optical axis in a normal direction to the layer plane. It is thus possible to pattern a retardation film—that is usually affixed to the outside of a liquid crystal cell so as to widen a viewing angle—directly on the transparent substrate forming part of the liquid crystal cell and include it within the liquid crystal cell. Therefore, it is possible to provide a high-quality liquid crystal display that can prevent a lowering of contrast due to adhesive's interfacial reflection with limited chromatic dispersion, especially a vertical alignment mode liquid crystal display.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

The rudimental principles of the phase difference compensation used herein are known from, e.g., Patent Publication 2. This phase difference compensation is now explained.

For the phase difference control layer structure used herein, a positive phase layer having an optical axis within a layer plane and a negative phase layer having an optical axis in a normal direction to that layer plane are used.

Figure 8A:
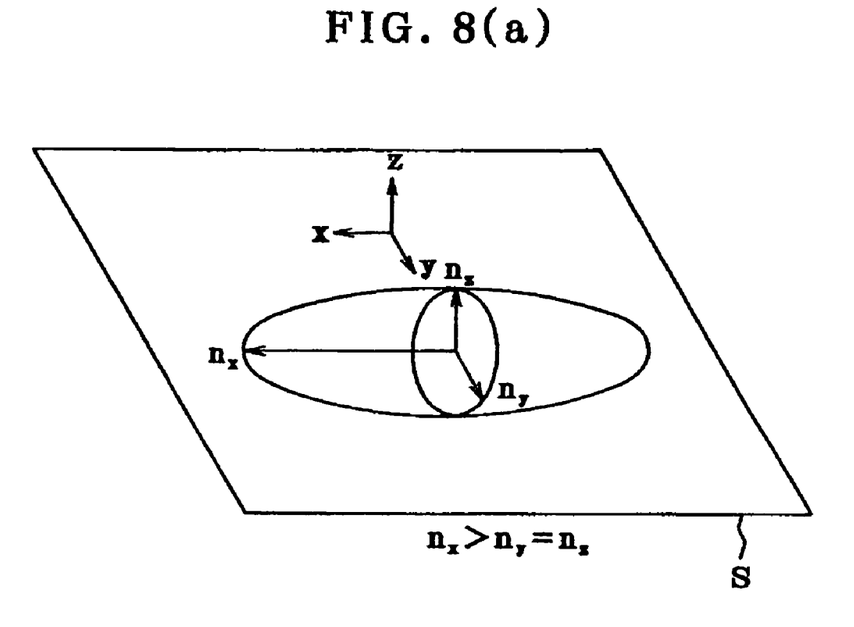
FIGS. 8(a) and 8(b) are illustrative of a positive uniaxial phase layer having an optical axis in a layer plane and a negative uniaxial phase layer having an optical axis in a normal direction to the phase plane.
Figure 8B:
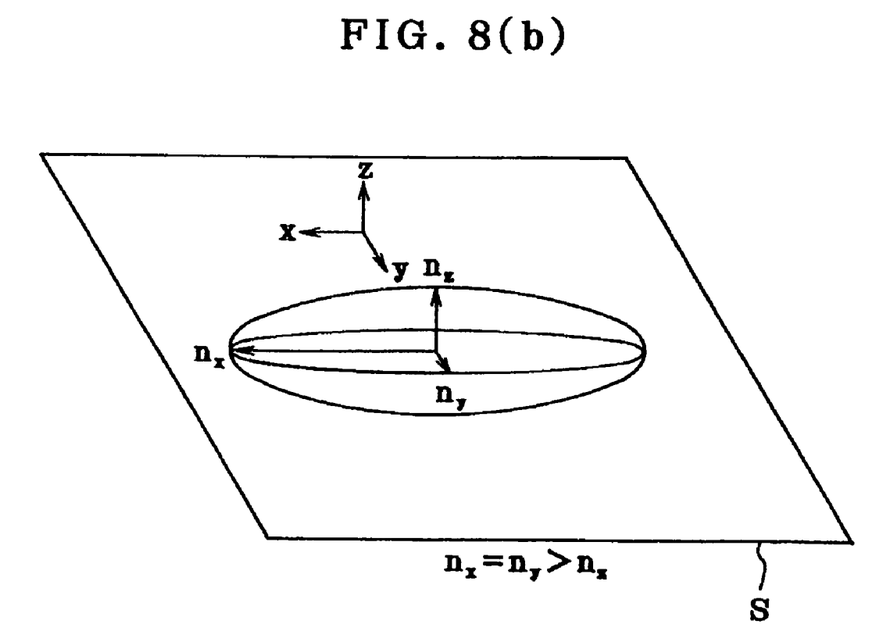

Two such phase layers are now explained with reference to FIGS. 8(a) and 8(b). Here, a z-axis is defined in a normal direction to a layer plane S and x- and y-axes are done in orthogonal directions in that layer plane S, with the refractive indices in the x-, y- and z-axis directions given by $n_x$, $n_y$ and $n_z$, respectively. As shown in FIG. 8(a), a phase layer having the relation $n_x > n_y = n_z$ provides an optically positive, uniaxial phase layer in that layer plane S, hereinafter called a positive A plate. As shown in FIG. 8(b), a phase layer having the relation $n_x = n_y > n_z$ provides an optically negative, uniaxial phase layer in the normal direction to that layer plane S, hereinafter called a negative C plate.

For instance, such a positive A plate may be obtained by planar alignment of nematic polymerizable liquid crystal molecules having positive refractive index anisotropy within the layer plane, and the negative C plate may be obtained by mixing a chiral agent with such liquid crystals and twisting the helical axis in the normal direction to the layer phase.

Referring here to an LCD of the vertical alignment (VA) mode, at no applied voltage, the liquid crystal molecules in a liquid crystal cell line up in a substantially vertical direction to a substrate to provide black displays. At an applied voltage, the liquid crystal molecules line up in a substantially parallel direction to the substrate to provide white displays. As typically set forth in Patent Publication 2, the positive A plate and negative C plate are located between the liquid crystal cell and one polarizing plate in such a way that the A plate is positioned on the polarizing plate side while the C plate is positioned on the liquid crystal cell side, thereby reducing leakage of light from a black display pixel upon viewing from an oblique direction. Problems with such an arrangement are, however, that it is required that, as already described, the positive A plate be affixed to the polarizing plate and the negative C plate to the liquid crystal cell substrate with the use of an adhesive having a different refractive index; there is reflection of light at an interface, which otherwise causes a display contrast decrease or other defects.

Figure 1A:
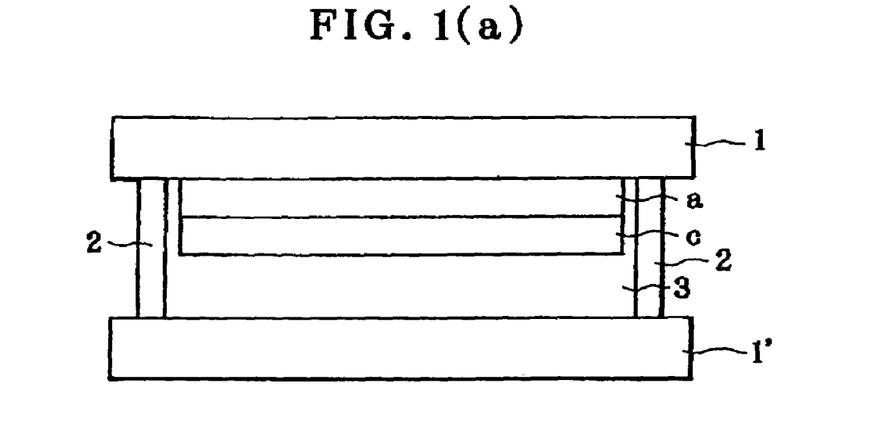
FIGS. 1(a), 1(b) and 1(c) are schematically illustrative of liquid crystal cell sections of one embodiment of the liquid crystal display according to the invention.
Figure 1B:
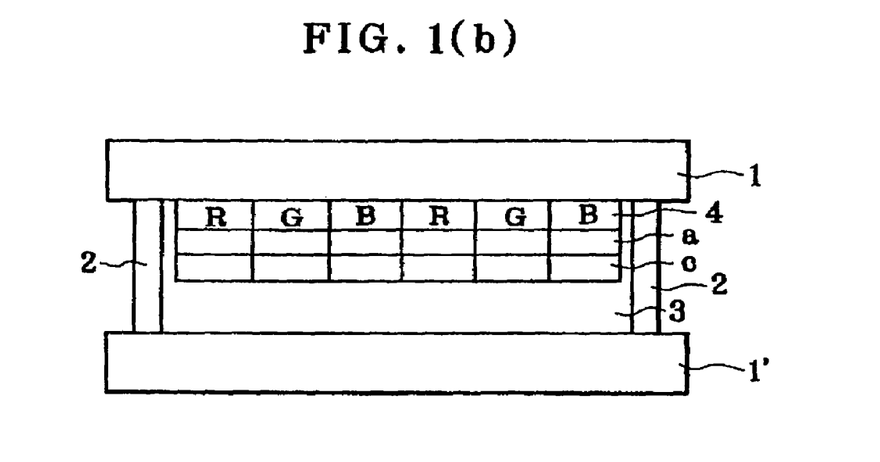
Figure 1C:
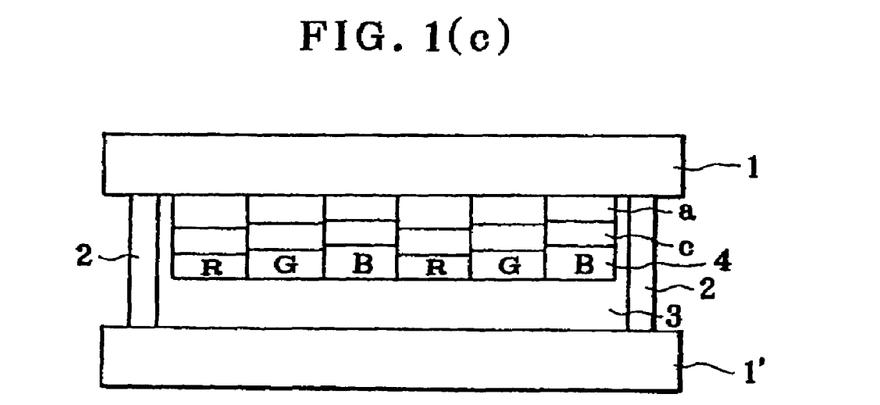

In accordance with the liquid crystal display of the invention as shown in FIGS. 1(a), 1(b) and 1(c) illustrative schematically of liquid crystal cell sections of that liquid crystal display, therefore, a positive A plate a and a negative C plate c are located inside of transparent substrates 1, 1' forming part of a liquid crystal cell while they are stacked on one of those transparent substrates (substrate 1 in FIG. 1(a)). It is here noted that reference numeral 2 are sealing members for making seals between the transparent substrates 1 and 1' to form the liquid crystal cell, reference numeral 3 is a liquid crystal layer of the VA mode, and reference numeral 4 is an RGB color filter (a filter element for transmitting red is indicated at "R", a filter element for transmitting green at "G", and a filter element for transmitting blue at "B"). It is also noted that the alignment layer for aligning the liquid crystal layer 3, the electrode layers, the TFTs for controlling the respective pixels, etc. are all not shown.

FIG. 1(a) is directed to a liquid crystal cell capable of black-and-white displays with no color filter, and FIGS. 1(b) and 1(c) are each directed to a liquid crystal cell capable of color displays, with a color filter 4 mounted thereon. In the color display liquid crystal cell, it is acceptable that the color filter 4 is stacked on the substrate 1 with the positive A plate a and negative C plate c placed thereon, as shown in FIG. 1(b). However, it is preferable that, as shown in FIG. 1(c), the positive A plate a and negative C plate c are stacked on the transparent substrate 1 or 1' with the color filter 4 placed on the C plate c. The reason is that the optimum thickness of phase difference control layers such as the positive A plate a and negative C plate c varies with R, G and B wavelengths because of incidental chromatic dispersion. Specifically, the order of thickness should be thickness of the R area>thickness of the G area>thickness of the B area provided that such areas are formed of the same material. To this end, the positive A plate a and negative C plate c should preferably be prepared by patterning for each R, G, B pixel, as shown in FIG. 1(c). However, this causes some levels among the pixels. To make compensation for such levels among the pixels thereby allowing the liquid crystal layer 3 to have uniform thickness, it is preferable to rely upon the arrangement of FIG. 1(c) wherein the R, G, B elements of the color filter 4 can vary in thickness. For the arrangement as shown in FIG. 1(b), it is desired that some protective layer varying in thickness among the pixels be provided on the C plate c to make compensation for such levels among the pixels.

Figure 2A:
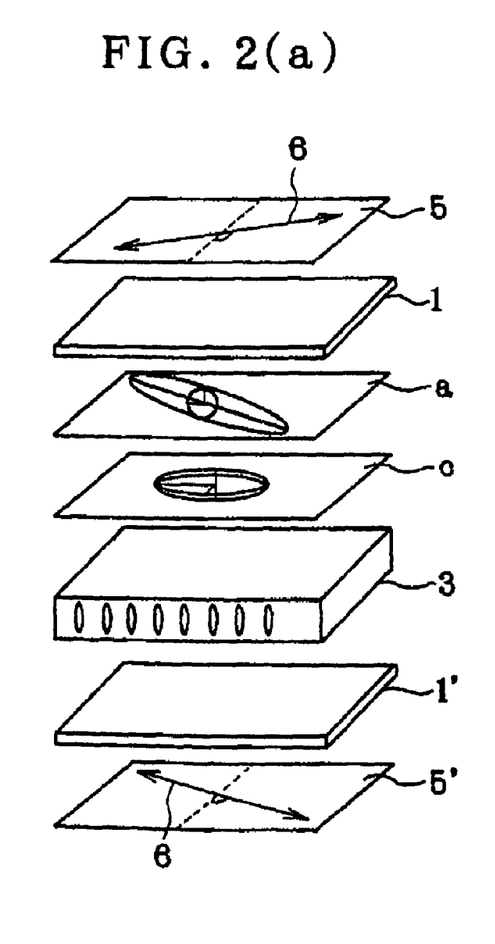
FIGS. 2(a) and 2(b) are exploded perspectives illustrative schematically of one possible arrangement of a liquid crystal display in which at least one of a positive A plate and a negative C plate is located in a liquid crystal cell according to the invention.
Figure 2B:
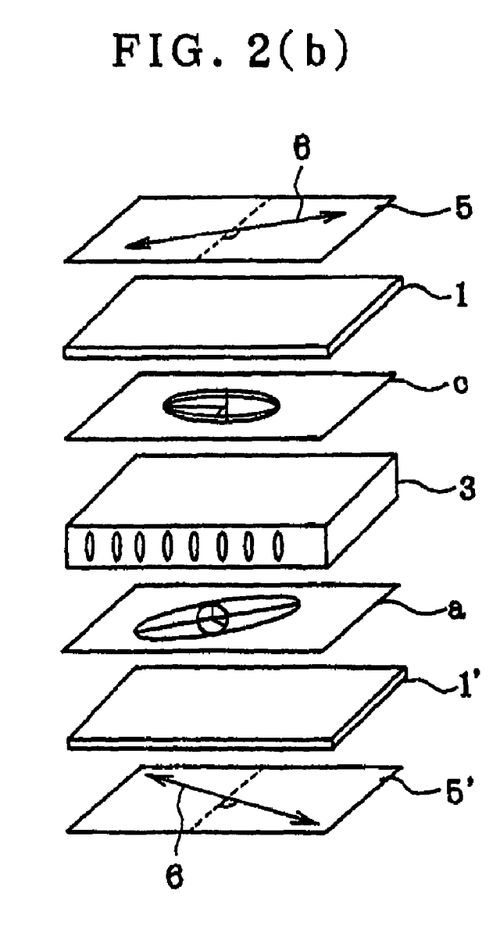
Figure 3A:
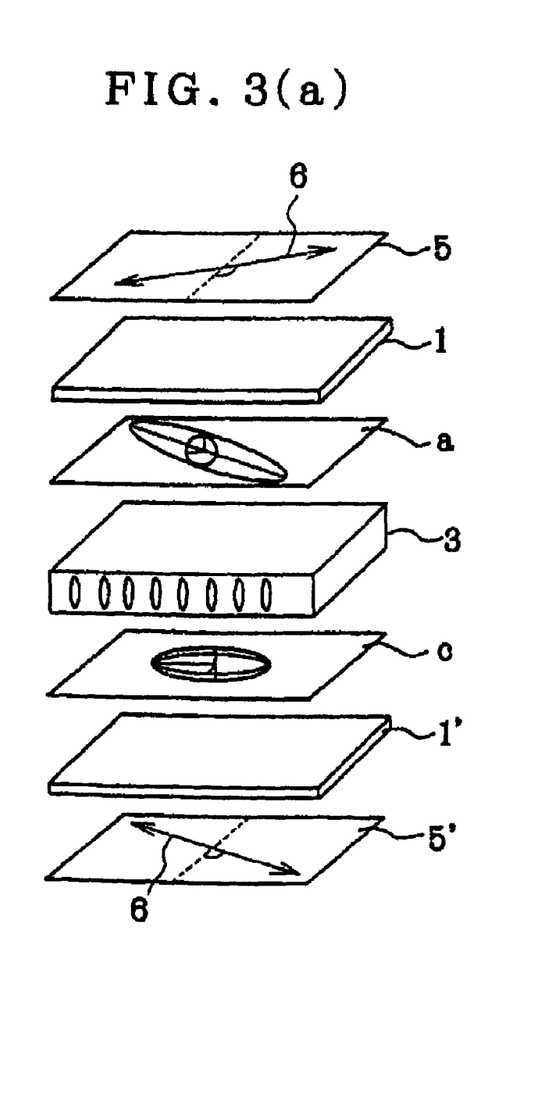
FIGS. 3(a) and 3(b) are exploded perspectives illustrative schematically of another possible arrangement of the liquid crystal display in which at least one of a positive A plate and a negative C plate is located in a liquid crystal cell according to the invention.
Figure 3B:
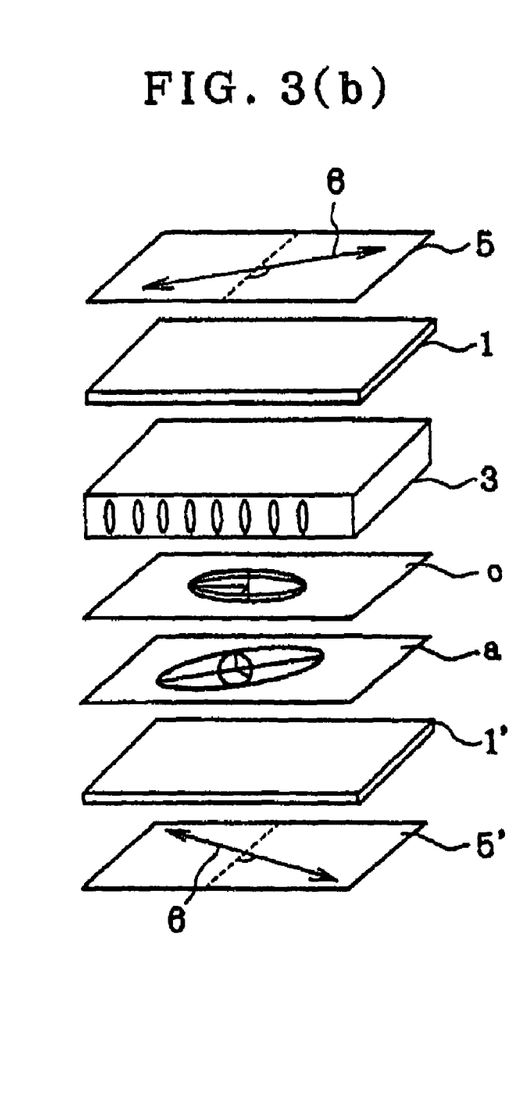
Figure 4A:
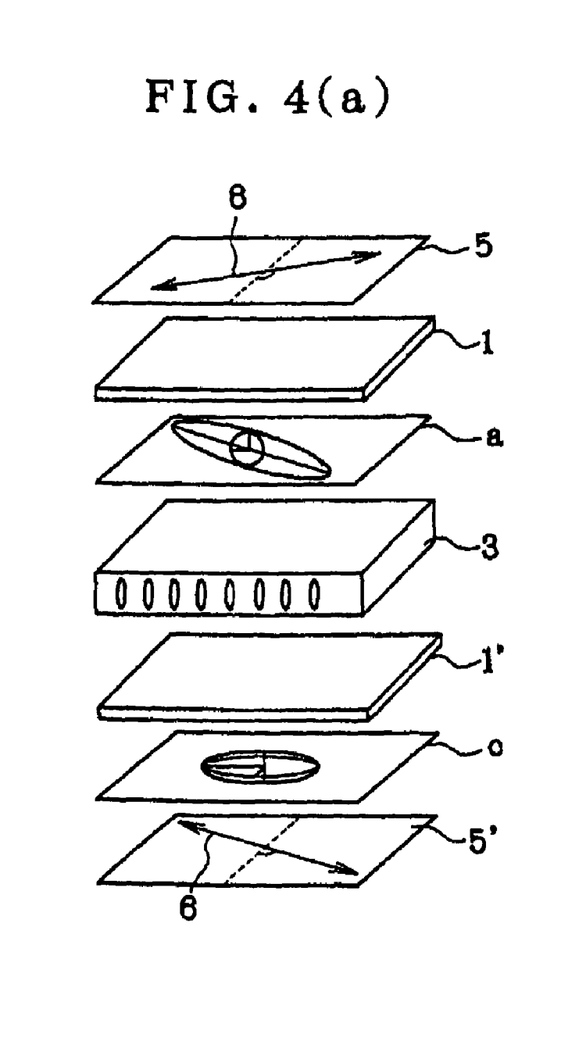
FIGS. 4(a) and 4(b) are exploded perspectives illustrative schematically of yet another possible arrangement of the liquid crystal display in which at least one of a positive A plate and a negative C plate is located in a liquid crystal cell according to the invention.
Figure 4B:
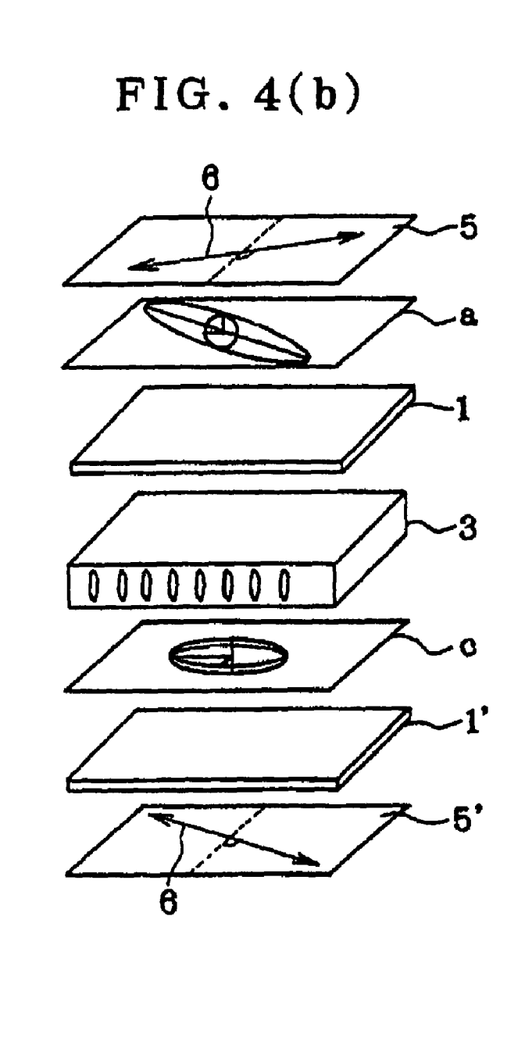

FIGS. 2(a), 2(b), FIGS. 3(a) and 3(b) and FIGS. 4(a) and 4(b) are exploded perspectives illustrative of possible arrangements of a liquid crystal display in which at least one of a positive A plate a and a negative C plate c is located in a liquid crystal cell according to the invention. It is here noted that sealing members, an alignment layer, electrode layers, TFTs, etc. are all not shown. While, in these figures, the positive A plate a and negative C plate c are shown to be separated from each other, it should be understood that they are actually stacked directly on the substrate 1 or 1' via an alignment layer (as shown in FIG. 1(b), the color filter 4 is often used). It is also understood that, as shown in FIGS. 4(a) and 4(b), only one of the positive A plate a and negative C plate c could be located in the liquid crystal cell.

FIGS. 2(a), 2(b), FIGS. 3(a) and 3(b) and FIGS. 4(a) and 4(b) are now briefly explained. A liquid crystal cell comprises two transparent substrates 1 and 1' and a liquid crystal layer 3 sandwiched between them, and two polarizing plates 5 and 5' with absorption axes 6 crossing at right angles in a cross polarization state are located on both sides of the liquid crystal cell to set up a liquid crystal display.

Referring specifically to FIG. 2(a), the positive A plate a and negative C plate c are stacked on the inside of the transparent substrate 1 while the positive A plate a is positioned on the polarizing plate 5 side and the negative C plate c is positioned on the liquid crystal layer 3 side.

Referring to FIG. 2(b), the negative C plate c and positive A plate a are separated from each other; the negative C plate c is positioned on the inside of the transparent substrate 1 and the positive A plate a is positioned on the inside of the transparent substrate 1'.

FIG. 3(a) in contrast to FIG. 2(b), the positive A plate a and negative C plate c are separated from each other; the positive A plate a is positioned on the inside of the transparent substrate 1 and the negative C plate c is positioned on the inside of the transparent substrate 1'.

Referring to FIG. 3(b) in contrast to FIG. 2(a), the positive A plate a and negative C plate c are stacked on the inside of the transparent substrate 1' while the positive A plate a is positioned on the polarizing plate 5' side and the negative C plate c is positioned on the liquid crystal layer 3 side.

Referring to FIG. 4(a), the positive A plate a is stacked on the inside of the transparent substrate 1 whereas the negative C plate c is stacked on the outside of the transparent plate 1'.

Referring to FIG. 4(b), the negative C plate c is put on the inside of the transparent substrate 1' whereas the positive A plate a is put on the outside of the transparent substrate 1.

Commonly to these embodiments, the positive A plate a adjacent to the polarizing plate 5, 5' is located in such a way that its optical axis crosses at right angles with the absorption axis 6 of the polarizing plate 5, 5'.

According to the aforesaid arrangements of the invention, there can be provided a high-contrast, wide-viewing angle VA mode LCD with limited interfacial reflected light, because the whole or a part of the phase difference control layers (the positive A plate a and negative C plate c) that have so far been affixed to the outside of a liquid crystal cell is located in the liquid crystal cell using polymerizable liquid crystal molecules, as shown in FIGS. 2(a) and 2(b), FIGS. 3(a) and 3(b) and FIGS. 4(a) and 4(b). When only one of the positive A plate a or the negative C plate c is located on the outside of the liquid crystal cell, too, there can be provided a high-contrast, wide-viewing angle VA mode LCD with limited interfacial reflected light, because it can be mounted on the outside of the transparent substrate 1, 1' by the direct use of polymerizable liquid crystal molecules. It is also understood that the positive A plate a or the negative C plate c located on the outside of the transparent substrate 1, 1' could be prepared by using a uniaxially or biaxially stretched transparent polycarbonate or other polymeric film as is the case with the prior art rather than by the direct use of polymerizable liquid crystal molecules.

The liquid crystal monomer molecules (polymerizable liquid crystal molecules) capable of three-dimensional crosslinking thereby forming phase difference control layers usable as the positive A plate a and negative C plate c in the invention, for instance, include mixtures of liquid crystal monomers and chiral compounds such as those disclosed in Patent Publications 3 and 4. Exemplary such polymerizable liquid crystal materials include such compounds as included in the following general formula 11 and mixtures of two or more of compounds having chemical formulae 1 to 10. In the liquid crystal monomers represented by general chemical formula 11, X should preferably be an integer of 2 to 5.

CHEMICAL FORMULA 1

CHEMICAL FORMULA 2

CHEMICAL FORMULA 3

CHEMICAL FORMULA 4

CHEMICAL FORMULA 5

CHEMICAL FORMULA 6

CHEMICAL FORMULA 7

CHEMICAL FORMULA 8

CHEMICAL FORMULA 9

CHEMICAL FORMULA 10

CHEMICAL FORMULA 11

As the chiral agent, those having chemical structures represented by the following formulae (12) to (14) are suitably usable.

CHEMICAL FORMULA 12

CHEMICAL FORMULA 13

CHEMICAL FORMULA 14

In the chiral agents represented by the above formulae (12) and (13), Y stands for either one selected from the substituents represented by the following formulae (i) to (xxiv), and $R_4$ stands for hydrogen or a methyl group. Preferably in the above formulae (12) and (13), X is an integer of 2 to 12.

Preferably in the chiral agent represented by the above formula (14), X is an integer of 2 to 5.

(i)

(ii)

(iii)

(iv)

(v)

-continued

(vi)

(vii)

(viii)

(ix)

(x)

(xi)

(xii)

(xiii)

Embodiments of the liquid crystal display-dedicated substrate having a phase difference control function according to the invention and a liquid crystal display using the same are now explained in further detail. The liquid crystal display works in the MVA (multi-domain-vertical alignment) mode.

(1) Preparation of the Underlying Substrate

First, a glass substrate (1737 Material made by Coning Co., Ltd.) was provided as a suitably washed substrate. Then, using AL1254 (made by JSR) as an alignment film material, an alignment film was formed on that glass substrate by means of flexography.

Subsequently, the alignment film was rubbed in a known manner to obtain an underlying substrate. While the glass substrate is used as the substrate in this embodiment, it is understood that plastic substrates comprising polycarbonate, polymethyl methacrylate, polyethylene terephthalate, tri-acetyalcellulose, etc., too, could be used. Besides, films such as polyether sulfone, polysulfone, polypropylene, polyimide, polyamide-imide or polyether ketone films could be used.

(2) Ink Preparation

A polymerizable liquid crystal ink was prepared as an ink for the positive A plate phase difference control layer by mixing together 75 parts by weight of liquid crystal material having polymerizable acrylate groups at both terminals with a spacer between the center mesogen and the acrylate, 1 part by weight of a photo-polymerization initiator Irgacure Irg184 (made by Chiba Speciality Chemicals Co., Ltd.) and 25 parts by weight of a solvent toluene.

Polymerizable liquid crystal material for the negative C plate phase difference control layer was prepared with the addition to the aforesaid ink for the A plate phase difference control layer of 5 parts by weight of a chiral agent material having polymerizable acrylate groups at both terminals.

(3) Formation of the Positive a Plate Phase Difference Control Layer

The thus prepared ink was coated on the substrate with the alignment film formed thereon, using spin coating. While spin coating is used in this embodiment, it is understood that other coating processes such as die coating or slit coating could be used alone or in combination of two or more, provided that a uniform coating can be obtained on the substrate.

Subsequently, that substrate was heated at 100° C. for 5 minutes on a hot plate for removal of solvent residues, thereby growing a liquid crystal structure.

Subsequently, the coated liquid crystal film was irradiated with ultraviolet radiation (10 J/cm$^2$; 365 nm wavelength) through a photomask to bake a pattern on only a portion to be provided with green pixels in a later step.

Finally, the substrate was dipped in a developer methanol for 3 minutes for removal of unexposed liquid crystal film portions, rinsed with pure water for 1 minute, and then heated for 10 minutes on a 100° C. hot plate for thorough drying, thereby obtaining a positive A plate phase difference control layer at a thickness of 1.0 μm.

Positive A plate phase difference control layers for blue and red pixels were prepared at similar coating and patterning steps with varying thickness. The thickness was 0.8 μm for blue, and 1.2 μm for red.

(4) Formation of the Negative C Plate Phase Difference Control Layer

Using the ink for the negative C plate phase difference control layer, the negative C plate phase difference control layer was patterned at a thickness of 2.5 μm on the substrate used in (1) to (3) above by a process similar to that for the positive A plate phase difference control layer, thereby stacking the negative C plate phase difference control layer directly on the positive A plate phase difference control layer. While the negative C plate phase difference control layer was stacked directly on the positive A plate phase difference control layer in this embodiment, it is understood that the positive A plate phase difference control layer and negative C plate phase difference control layer could be each located on the inside or outside of the substrate on the backlight side or the viewing side, as shown in FIGS. 2-4; any of the arrangements of FIGS. 2(a) and 2(b), FIGS. 3(a) and 3(b) and FIGS. 4(a) and 4(b) could be used without reservation.

Such coating and patterning as described above were further conducted for blue and red pixels at a thickness of 2.6 μm, and 2.4 μm, respectively.

(5) Formation of the Color Filter

On the substrate with a stack of the above positive A and negative C plate phase difference control layers provided thereon, a color filter comprising a black matrix and an RGB colored pixel pattern was formed by a known technique in such a way that the RGB colored pixel pattern varied in thickness with R, G and B elements to make compensation for levels among the pixels, thereby making the VA mode liquid crystal layer uniform, as shown in FIG. 1(c).

Next, an ITO film electrode was formed at a thickness of 2,000 Å by means of sputtering, and projections for controlling the alignment direction of liquid crystal molecules were then provided in four-divided alignment directions in such a way as to provide the same area in each alignment direction.

In the instant embodiment, the color filter layer was provided on the stack of the phase difference control layers. According to the invention, however, it is understood that the color filter layer is not necessarily mounted in that position; it could be located within the two opposing glass substrates.

(6) Construction of the Vertical Alignment Display

After a vertical alignment film was provided on the thus obtained MVA mode LCD color filter having a phase difference control function, the stack was affixed to an opposing substrate with a gap located between them, and a liquid crystal MLC-6608 (made by Merck & Co., Inc.) having negative dielectric anisotropy was poured in that gap to obtain an MVA mode liquid crystal display.

Figure 5:
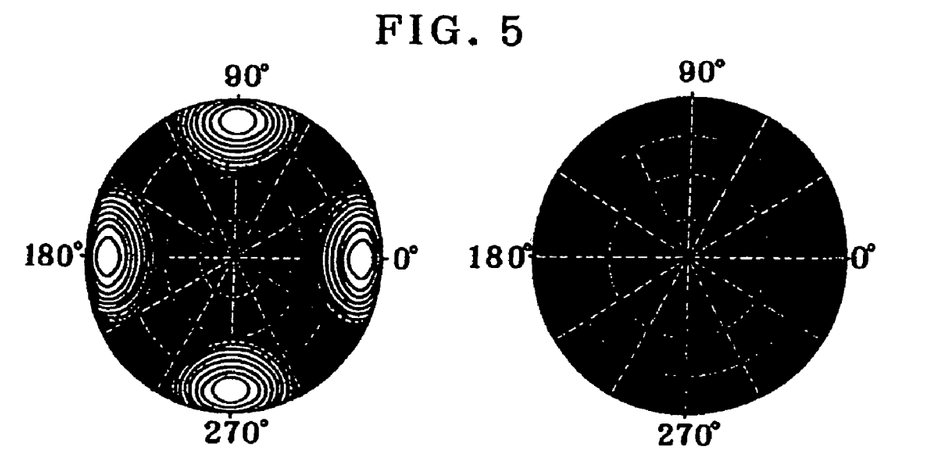
FIG. 5 is illustrative of how B light leaks from an MVA mode liquid crystal display upon black displays, in which an MVA mode LCD color filter having a phase difference control function is provided according to one embodiment of the invention, together with a comparative control.
Figure 6:
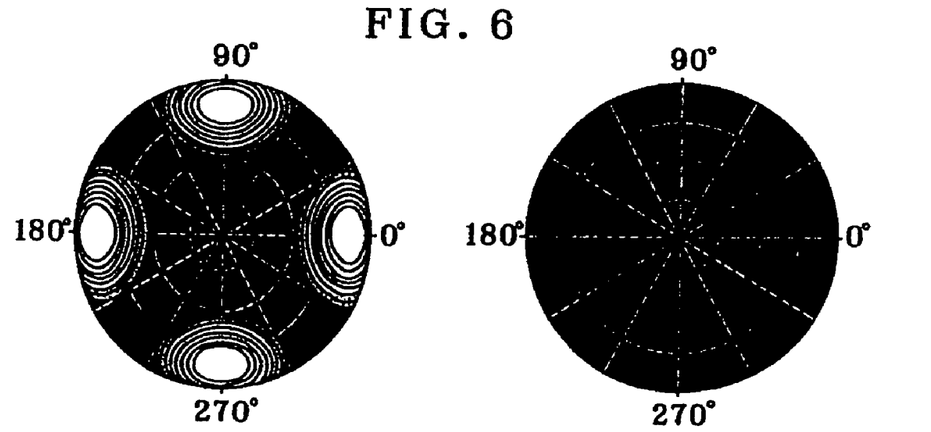
FIG. 6 is illustrative of how G light leaks from an MVA mode liquid crystal display upon black displays, in which an MVA mode LCD color filter having a phase difference control function is provided according to one embodiment of the invention, together with a comparative control.
Figure 7:
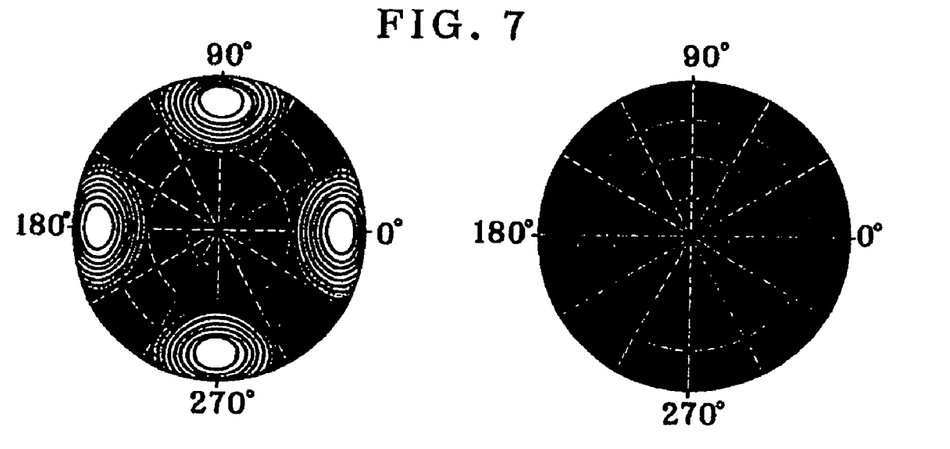
FIG. 7 is illustrative of how R light leaks from an MVA mode liquid crystal display upon black displays, in which an MVA mode LCD color filter having a phase difference control function is provided according to one embodiment of the invention, together with a comparative control.

Leakage of light from the obtained MVA mode liquid crystal display upon black displays is shown in FIGS. 5-7 along with that from a comparative display having no phase difference control layers. In each figure, the light leakage of the control embodiment is shown on the left side and that of the inventive embodiment on the right side. For measurement, EZContrast 160R (made by ELDIM) was used. In FIG. 5, a 450 nm light source was used for B (blue); in FIG. 6, a 550 nm light source for G (green); and in FIG. 7, a 610 nm light source for R (red). While the light was entered in each liquid crystal display in a black state, the ensuing light leakage was studied through an azimuth angle of 360° and a polar angle of 80°. The azimuth angles of the absorption axes of two polarizing plates were 45° and 135°. In FIGS. 5-7, it is noted that the center of circle has a polar angle of 0° and the periphery of circle has a polar angle of 80°. It is thus seen that at the respective wavelengths, light leakage at the azimuth angles of 0°, 90°, 180° and 270° is much reduced as compared with that in the control embodiment.

In the invention, the alignment layer and phase difference control layers can be formed on only the respective effective display areas by means of patterning and the stack is affixed to the opposing substrate with the sealing member 2 (FIGS. 1(a) and 1(b)) located on the glass surface, so that reliable sealing can be achieved, providing a liquid crystal display having improved robustness. It is then desired that the patterned outermost end face of each phase difference control layer be positioned at least 50 μm inwardly of the affixed (sealed) portion of the sealing member 2.

For the invention, an alignment film is required for the alignment of polymerizable liquid crystal molecules. Especially for the attachment of the first positive A plate a or negative C plate c onto the substrate, the alignment film is essentially required. When the negative C plate c is stacked on the positive A plate a, the underlying positive A plate a may be allowed to function as a kind of alignment film; however, more reliable alignment is achievable by the use of the second or another alignment film.

Generally in the invention, the refractive index anisotropy—a value obtained by subtracting ordinary index from extraordinary index—is in the range of 0.05 to 0.30; the refractive index anisotropy of the polymerizable liquid crystal molecules used as the positive A plate a or the negative C plate c is in the rang of 0.05 to 0.30; the cell gap (the thickness of the liquid crystal layer 3) of the liquid crystal cell is in the range of 1.0 μm to 6.0 μm, and the thickness of the positive A plate a or negative C plate c comprising polymerizable liquid crystal molecules is in the range of 0.1 μm to 10.0 μm.

While the liquid crystal display-specific substrate having a phase difference control function according to the invention and the liquid crystal display using the same have been described with reference to the principles and embodiments of the invention, it should be understood that the invention is in no sense limited thereto, and so many modifications could be possible.

As can be appreciated from the foregoing, the present invention provides a liquid crystal display-specific substrate having a phase difference control function and a liquid crystal display using the same, wherein on a substrate of transparent substrates between which a liquid crystal layer in the liquid crystal display is sandwiched, said substrate being located on the liquid crystal layer side, there is patterned at least one of a positive uniaxial phase layer comprising polymerizable liquid crystal molecules and having an optical axis within a layer plane and a negative uniaxial phase layer comprising polymerizable liquid crystal molecules and having an optical axis in a normal direction to the layer plane. It is thus possible to pattern a retardation film—that is usually affixed to the outside of a liquid crystal cell so as to widen a viewing angle—directly on the transparent substrate forming part of the liquid crystal cell and include it within the liquid crystal cell. Therefore, it is possible to provide a high-quality liquid crystal display that can prevent a lowering of contrast due to adhesive's interfacial reflection with limited chromatic dispersion, especially a vertical alignment mode liquid crystal display.

I claim:

1. A liquid crystal display-specific substrate having a phase difference control function, used for transparent substrates with a liquid crystal layer in a liquid crystal display sandwiched between said transparent substrates, wherein:

at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane is patterned on a liquid crystal layer side.

2. The liquid crystal display-specific substrate having a phase difference control function according to claim 1, wherein said negative uniaxial phase layer comprising polymerizable liquid crystal molecules and having an optical axis in a normal direction to said layer plane comprises a mixture of polymerizable liquid crystal molecules and a chiral agent.

3. A liquid crystal display-specific substrate having a phase difference control function, used for transparent substrates with a liquid crystal layer in a liquid crystal display sandwiched between said transparent substrates, wherein:

an alignment film, a positive uniaxial phase layer comprising polymerizable liquid crystal molecules and having an optical axis within a layer plane, and a negative uniaxial phase layer comprising polymerizable liquid crystal molecules and having an optical axis in a normal direction to said layer plane are stacked in this order on a liquid crystal layer side.

4. The liquid crystal display-specific substrate having a phase difference control function according to claim 3, which further comprises an additional alignment film between said positive uniaxial phase layer comprising polymerizable liquid crystal molecules and having an optical axis within a layer plane and said negative uniaxial phase layer comprising polymerizable liquid crystal molecules and having an optical axis in a normal direction to said layer plane.

5. The liquid crystal display-specific substrate having a phase difference control function according to claim 1, wherein one of said positive uniaxial phase layer having an optical axis within a layer plane or said negative uniaxial phase layer having an optical axis in a normal direction to said layer plane is applied in a film state to a liquid crystal layer opposite side of said transparent substrates between which said liquid crystal layer in said liquid crystal display is sandwiched.

6. The liquid crystal display-specific substrate having a phase difference control function according to any one of claims 1 to 5, wherein:
said liquid crystal display-specific substrate having a phase difference control function, obtained by patterning of at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane, comprises three-color areas of red, green and blue, and at least one of said phase difference control layers is patterned in alignment with said three-color areas for red, green and blue.

7. The liquid crystal display-specific substrate having a phase difference control function according to claim 1, wherein said liquid crystal layer aligns in a vertical mode.

8. The liquid crystal display-specific substrate having a phase difference control function according to claim 7, wherein said liquid crystal molecules used for said vertical alignment mode liquid crystal layer has a refractive index anisotropy of 0.05 to 0.30, and said polymerizable liquid crystal molecules used as said phase layers have a refractive index anisotropy of 0.05 to 0.30.

9. The liquid crystal display-specific substrate having a phase difference control function according to claim 7 or 8, wherein said vertical alignment mode liquid crystal layer has a thickness of 1.0 µm to 6.0 µm, and said phase layers comprising polymerizable liquid crystal molecules have a thickness of 0.1 µm to 10.0 µm.

10. A liquid crystal display comprising transparent substrates between which a liquid crystal layer is sandwiched, wherein:
at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane is patterned on an inner surface of said transparent substrates.

11. The liquid crystal display according to claim 10, wherein said negative uniaxial phase layer comprising polymerizable liquid crystal molecules and having an optical axis in a normal direction to said layer plane comprises a mixture of polymerizable liquid crystal molecules and a chiral agent.

12. A liquid crystal display, wherein:
an alignment film, a positive uniaxial phase layer comprising polymerizable liquid crystal molecules and having an optical axis within a layer plane, and a negative uniaxial phase layer comprising polymerizable liquid crystal molecules and having an optical axis in a normal direction to said layer plane are stacked in this order on an inner surface of one of transparent substrates between which a liquid crystal layer is sandwiched.

13. The liquid crystal display according to claim 12, which further comprises an additional alignment film between said positive uniaxial phase layer comprising polymerizable liquid crystal molecules and having an optical axis within a layer plane and said negative uniaxial phase layer comprising polymerizable liquid crystal molecules and having an optical axis in a normal direction to said layer plane.

14. The liquid crystal display according to claim 10, wherein one of said positive uniaxial phase layer having an optical axis within a layer plane or said negative uniaxial phase layer having an optical axis in a normal direction to said layer plane is applied in a film state to a liquid crystal layer opposite side of said transparent substrates between which said liquid crystal layer is sandwiched.

15. The liquid crystal display according to any one of claims 10 to 14, wherein:
said liquid crystal display-specific substrate having a phase difference control function, obtained by patterning of at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane, comprises three-color areas of red, green and blue, and at least one of said phase difference control layers is patterned in alignment with said three-color areas for red, green and blue.

16. The liquid crystal display according to claim 10, wherein said liquid crystal layer aligns in a vertical mode.

17. The liquid crystal display according to claim 16, wherein said liquid crystal molecules used for said vertical alignment mode liquid crystal layer has a refractive index anisotropy of 0.05 to 0.30, and said polymerizable liquid crystal molecules used as said phase layers have a refractive index anisotropy of 0.05 to 0.30.

18. The liquid crystal display according to claim 16 to 17, wherein said vertical alignment mode liquid crystal layer has a thickness of 1.0 µm to 6.0 µm, and said phase layers comprising polymerizable liquid crystal molecules have a thickness of 0.1 µm to 10.0 µm.

19. A liquid crystal display-specific substrate having a phase difference control function, used for transparent substrates with a liquid crystal layer in a liquid crystal display sandwiched between said transparent substrates, wherein:
at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane is patterned on a liquid crystal layer side,
said liquid crystal display-specific substrate having a phase difference control function, obtained by patterning of at least one of a positive uniaxial phase layer comprising polymerizable liquid crystal molecules and having an optical axis within a layer plane or a negative uniaxial phase layer comprising polymerizable liquid crystal molecules and having an optical axis in a normal direction to said layer plane, comprises three-color areas of red, green and blue, and at least one of said phase difference control layers is patterned in alignment with said three-color areas for red, green and blue, said positive uniaxial phase layer comprising polymerizable liquid crystal molecules and having an optical axis within a layer plane, patterned in alignment with the three-color areas of red, green and blue of a color filter, is formed with such a thickness as to be thickness of said red area>thickness of said green area>thickness of said blue area, and said negative uniaxial phase layer comprising polymerizable liquid crystal molecules and having an optical axis in a normal direction to said layer plane, patterned in alignment with the three-color areas of red, green and blue of a color filter, is formed with such a thickness as to be thickness of said blue area>thickness of said green area>thickness of said red area.

20. The liquid crystal display-specific substrate according to claim 19, wherein said positive uniaxial phase layer is patterned on a liquid crystal layer side.

21. The liquid crystal display-specific substrate according to claim 19, wherein said negative uniaxial phase layer is patterned on a liquid crystal layer side.

22. The liquid crystal display-specific substrate according to claim 19, wherein both said positive uniaxial phase layer and said negative uniaxial phase layer are patterned on a liquid crystal layer side.

23. The liquid crystal display according to claim 12, wherein said positive uniaxial phase layer comprising polymerizable liquid crystal molecules and having an optical axis within a layer plane, patterned in alignment with the three-color areas of red, green and blue of a color filter, is formed with such a thickness as to be thickness of said red area>thickness of said green area>thickness of said blue area, and wherein said negative uniaxial phase layer comprising polymerizable liquid crystal molecules and having an optical axis in a normal direction to said layer plane, patterned in alignment with the three-color areas of red, green and blue of a color filter, is formed with such a thickness as to be thickness of said blue area>thickness of said green area>thickness of said red area.

24. The liquid crystal display according to claim 23, wherein said positive uniaxial phase layer is patterned on an inner surface of said transparent substrates.

25. The liquid crystal display according to claim 23, wherein said negative uniaxial phase layer is patterned on an inner surface of said transparent substrates.

26. The liquid crystal display according to claim 23, wherein both said positive uniaxial phase layer and said negative uniaxial phase layer are patterned on an inner surface of said transparent substrates.

* * * * *